April 12, 1932.  C. F. REIS  1,853,779
MAGNETO ROTOR
Filed Aug. 8, 1930

Inventor
Curt F. Reis
By
Eccleston & Eccleston,
Attorneys

Patented Apr. 12, 1932

1,853,779

UNITED STATES PATENT OFFICE

CURT FREDERICK REIS, OF CHICAGO, ILLINOIS, ASSIGNOR TO EXCEL MAGNETO CO., OF CHICAGO, ILLINOIS

MAGNETO ROTOR

Application filed August 8, 1930. Serial No. 474,052.

The present invention relates to magnetos and has for its primary object to provide a novel rotor for such devices which may be constructed at low cost and without sacrifice of efficiency.

Another object of the invention resides in the provision of a magneto rotor in which the magnetic flux may be varied in different installations by a simplified construction which readily admits of the variation of the number of magnets employed.

A further object of the invention consists in the use of laminations designed to increase the magnetic flux on the outer surface of the rotor.

Other objects and advantages of the invention will be apparent from the following description when taken in connection with the accompanying drawings, in which Figure 1 is a perspective view of a complete rotor with end portions of the shaft broken away.

Figure 1:
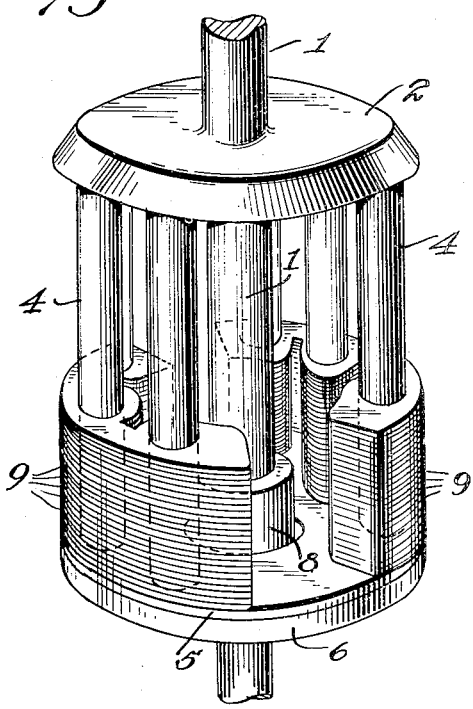

Referring to the drawings in greater detail the numeral 1 indicates the shaft of the rotor which is provided with the base plate 2; these elements being integrally formed of forged steel.

The base plate 2 is provided with a plurality of sockets or countersunk portions 3 in which are seated the adjacent ends of magnets 4. These magnets are of the bar type and may have any preferred cross-sectional shape, those here shown being circular. It will be understood that the countersunk portions 3 will be of a shape to correspond with the cross-sectional shape of the magnets.

The opposite ends of the magnets 4 are supported and secured in position by non-magnetic anchoring plates 5 and 6. The plate 5 is provided with a plurality of openings 7 corresponding in number to the number of magnets 4 and in which the ends of the latter are situated. The plate 6 is provided with an internally threaded boss 8 by means of which it may be screwed into position on the shaft 1. This plate serves not only to hold the plate 5 in proper cooperative relation to the magnets 4 but also engages the adjacent ends of the magnets and thus holds their opposite ends in the countersunk portions 3 of the base plate 2. It thus appears that a very simple and inexpensive means is provided for assembling and anchoring in spaced relation the magnets of a rotor, which means is strong and durable and extremely unlikely to become disarranged.

Figure 2:
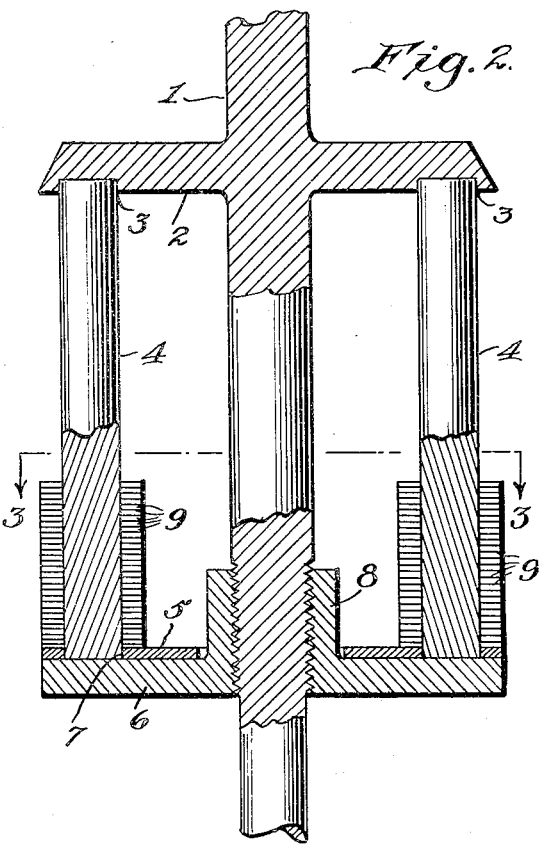
Figure 2 is a vertical sectional view through the rotor.
Figures 3, 4:
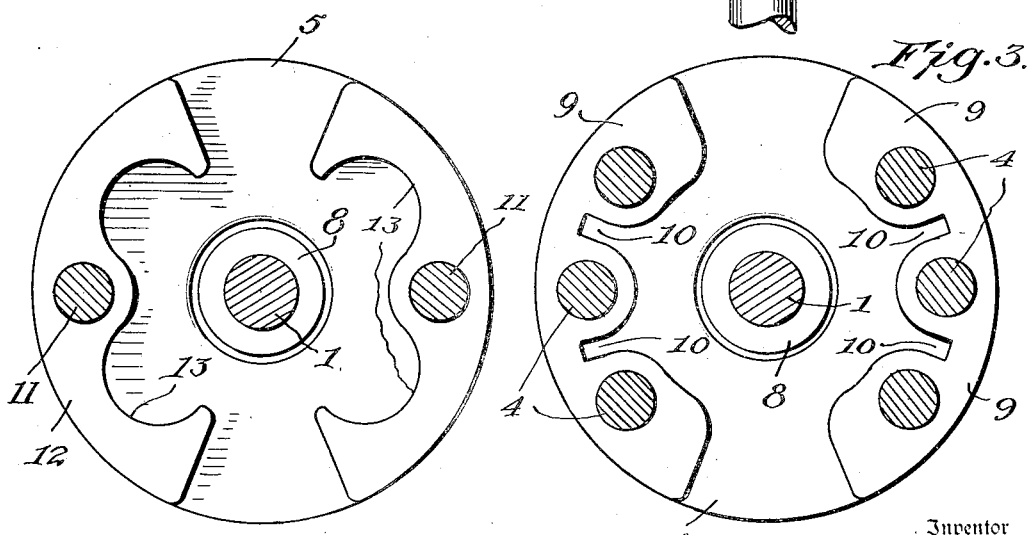
Figure 3 is a horizontal sectional view taken on line 3—3 of Figure 2.
Figure 4 is a view similar to Figure 3 showing a slightly different construction of rotor in which only two pole pieces are provided.

The magnets in the embodiment of the invention shown in Figures 1, 2 and 3 are arranged in groups of three, one group of magnets having all of their north poles at one end of the rotor, while the other group has all south poles at the same end of the rotor. It will be apparent, of course, that the number of magnets in each group may be increased or decreased in accordance with the desired amount of magnetic flux in the rotor.

For the purpose of reducing eddy currents and increasing the permeability of the magnetic field, the magnets 4 are provided with laminated pole pieces of soft iron or steel and in this regard the present invention is a modification of the rotor disclosed in my Patent No. 1,726,042, granted August 27, 1929, for rotor for magnetos. In the present construction the laminations which are indicated by the numeral 9 are of arcuate shape and are each provided with three apertures to receive the three magnets 4 of the particular group, there being a stack of laminations for each group. Each stack of laminations 9 serves to tie together the magnet ends of like polarity and also aid in producing a cumulative effect of the magnets of each group.

It is desirable, of course, to secure the greatest amount of magnetic flux on the exterior of the rotor, and to this end the laminations are provided with the notches 10 extending between the magnets 4 toward the outer periphery of the arcuate laminations.

In the modified construction shown in Figure 4, only two magnets 11 are employed and the laminations 12 are provided with inner cut-out portions 13 similar to the cut-out portions 10 of the construction shown in Figures 1, 2 and 3. In other respects the rotor shown in Figure 4 is identical with that heretofore described.

From the foregoing description taken in connection with the accompanying drawings it will be apparent to those skilled in the art that I have devised a magneto rotor of simple and inexpensive construction; that it is so designed as to permit of its being assembled with a varying number of magnets in accordance with the amount of magnetic flux desired; that the laminations are constructed to tie together the magnets of each group and provide a cumulative effect of the magnets; and that the laminations are so shaped as to create a maximum amount of magnetic flux on their exterior surfaces.

In accordance with the patent statutes I have described what I now consider the preferred form of the invention, but obviously minor changes may be made in the details of construction without departing from the spirit of the invention, and such changes or alterations are intended to be included within the scope of the appended claims.

What I claim is:

1. A rotor for magnetos including an integral shaft and base plate of forged steel, said plate provided with countersunk portions on the inner face thereof, permanent magnets each having one end positioned in a countersunk portion of the base plate, and means threaded to the shaft for holding said magnets in the countersunk portions.

2. A rotor for magnetos including an integral shaft and base plate, a plurality of permanent magnets, means on said base plate for supporting the adjacent ends of the magnets, an anchoring plate provided with cut-out portions to receive the opposite ends of said magnets, and a plate threaded to said shaft for securing the anchoring plate in position.

3. A rotor for magnetos including a shaft, a plurality of permanent magnets, means for spacing said magnets about said shaft in groups of two or more with the like poles in adjacent relation, laminations of soft metal encircling and tying together the magnet ends of each group, and a securing plate threaded on said shaft and engaging the magnet ends adjacent the laminations.

4. A rotor for magnetos including a shaft, a plurality of permanent magnets, means for spacing said magnets about said shaft in groups of two or more, and laminations of soft metal provided with openings corresponding in number to the number of magnets in each group, said laminations being threaded over and tying together like poles of the magnets of each group, and an anchoring plate threaded onto said shaft and abutting the ends of the magnets.

5. A rotor for magnetos comprising a one-piece rotor shaft and base plate, said base plate having spaced recesses in one of its faces, a plurality of permanent magnets seated in the recesses in the base plate, and a non-magnetic anchoring plate threaded onto said shaft and engaging the ends of said magnets at their ends remote from said base plate.

6. A magneto rotor comprising a one-piece rotor shaft and base plate, said base plate having spaced recesses in one of its faces, permanent magnets each having one end mounted in one of said recesses, laminated pole pieces on the free ends of said magnets, and a non-magnetic plate threaded to said shaft and abutting the ends of the magnets to form a rigid cage-like structure.

CURT FREDERICK REIS.